United States Patent
Tamada et al.

(10) Patent No.: US 9,862,234 B2
(45) Date of Patent: Jan. 9, 2018

(54) STRIP-SHAPED STEEL CORD

(71) Applicants: TOKYO ROPE MANUFACTURING CO., LTD., Tokyo (JP); NIPPON STEEL & SUMITOMO METAL CORPORATION, Tokyo (JP)

(72) Inventors: Akira Tamada, Tokyo (JP); Yuuki Murakami, Tokyo (JP); Shouichi Ohashi, Tokyo (JP); Satoshi Sugimaru, Tokyo (JP)

(73) Assignees: TOKYO ROPE MANUFACTURING CO., LTD., Tokyo (JP); NIPPON STEEL & SUMITOMO METAL CORPORATION, Tokyo (JP)

( * ) Notice: Subject to any disclaimer, the term of this patent is extended or adjusted under 35 U.S.C. 154(b) by 7 days.

(21) Appl. No.: 14/392,312

(22) PCT Filed: Jun. 23, 2014

(86) PCT No.: PCT/JP2014/066508
§ 371 (c)(1),
(2) Date: Dec. 24, 2015

(87) PCT Pub. No.: WO2014/208480
PCT Pub. Date: Dec. 31, 2014

(65) Prior Publication Data
US 2016/0193878 A1 Jul. 7, 2016

(30) Foreign Application Priority Data
Jun. 26, 2013 (JP) ................. 2013-133259

(51) Int. Cl.
*B60C 9/00* (2006.01)
*B60C 9/20* (2006.01)
(Continued)

(52) U.S. Cl.
CPC .......... *B60C 9/2006* (2013.01); *B32B 15/015* (2013.01); *B60C 9/00* (2013.01);
(Continued)

(58) Field of Classification Search
CPC ........ D07B 2205/3089; D07B 2801/18; D07B 1/06; D07B 1/062; D07B 1/16; D07B 2201/2033; D07B 2201/2043; B32B 15/01; B32B 15/015; B60C 2009/0014; B60C 2009/2077; B60C 9/007; B60C 9/2006; B60C 9/00; B60C 9/0007; B60C 2009/0071; D02G 3/12; D02G 3/36; D02G 3/48
(Continued)

(56) References Cited

U.S. PATENT DOCUMENTS

| 3,858,635 A | 1/1975 | Nakamoto et al. |
| 4,064,915 A | 12/1977 | Buyssens et al. |

(Continued)

FOREIGN PATENT DOCUMENTS

| CN | 101457493 A | 6/2009 |
| CN | 203654057 U | 6/2014 |

(Continued)

OTHER PUBLICATIONS

Taiwanese Office Action (and Search Report) dated Jun. 9, 2015 with an English translation thereof.
(Continued)

*Primary Examiner* — Camie S Thompson
(74) *Attorney, Agent, or Firm* — McGinn IP Law Group, PLLC

(57) ABSTRACT

A steel cord is obtained by bundling five steel core wires, which are arrayed in parallel with one another in a plane, into a unitary body by means of an adhesive having a thickness Ad of less than 15 μm. Each of the core wires-constituting the steel cord has a diameter d of less than 0.45 mm, and spacing Gd between the core wires is less than 20 μm. The core wires used have a free coil diameter D that is greater than wire diameter d thereof by 750 times or more.

4 Claims, 12 Drawing Sheets

(51) Int. Cl.
*B32B 15/01* (2006.01)
*D07B 1/06* (2006.01)
*D07B 1/16* (2006.01)
*D02G 3/12* (2006.01)
*D02G 3/36* (2006.01)
*D02G 3/48* (2006.01)

(52) U.S. Cl.
CPC ............. *B60C 9/0007* (2013.01); *B60C 9/20* (2013.01); *D02G 3/12* (2013.01); *D02G 3/36* (2013.01); *D02G 3/48* (2013.01); *D07B 1/06* (2013.01); *D07B 1/062* (2013.01); *D07B 1/16* (2013.01); *B60C 2009/0014* (2013.01); *B60C 2009/0071* (2013.01); *B60C 2009/2077* (2013.01); *D07B 2201/2033* (2013.01); *D07B 2201/2043* (2013.01); *D07B 2205/3089* (2013.01); *D07B 2401/205* (2013.01); *D10B 2101/20* (2013.01); *D10B 2505/12* (2013.01)

(58) Field of Classification Search
USPC ........................................ 428/295.4; 152/526
See application file for complete search history.

(56) References Cited

U.S. PATENT DOCUMENTS

| | | | |
|---|---|---|---|
| 4,718,224 A | 1/1988 | Obata | |
| 4,756,970 A | 7/1988 | Brandyberry et al. | |
| 2002/0189735 A1 | 12/2002 | Miyazaki et al. | |
| 2009/0288747 A1* | 11/2009 | Miyazaki | B60C 9/0007 152/451 |

FOREIGN PATENT DOCUMENTS

| | | |
|---|---|---|
| EP | 1 041 194 A1 | 10/2000 |
| EP | 1 406 773 B1 | 12/2010 |
| JP | S 52-8084 A | 1/1977 |
| JP | S 62-149929 A | 7/1987 |
| JP | S 63-240402 A | 10/1988 |
| JP | 07-304307 | * 11/1995 |
| JP | H 07-304307 A | 11/1995 |
| JP | H 10-292275 A | 11/1998 |
| JP | 2001-55008 A | 2/2001 |
| JP | 2001-322404 A | 11/2001 |
| JP | 2008-025040 A | 2/2008 |
| JP | 2008-200737 A | 9/2008 |
| JP | 2012-121324 A | 6/2012 |

OTHER PUBLICATIONS

Chinese Office Action (and Search Report) dated Dec. 28, 2015 with an English translation thereof.
International Search Report (ISR) (PCT Form PCT/ISA/210), in PCT/JP2014/066508, dated Sep. 22, 2014.
Extended European Search Report dated Jan. 3, 2017.

* cited by examiner

STRIP-SHAPED STEEL CORD

TECHNICAL FIELD

This invention relates to a strip-shaped steel cord.

BACKGROUND ART

In order to extend the life, improve the kinematic performance, reduce the weight and lower the cost of automobile tires, it is known to embed a steel cord, in which multiple wires made of steel are arrayed in parallel with one another, in the belt layer that constitutes the tire.

Patent Document 1 discloses a steel cord in which a steel wrapping wire is wound helically on multiple steel wires arrayed in parallel with one another. Accordingly, if the binding force produced by the steel wrapping wire is too great, a strong contact pressure acts between the multiple steel wires, fretting wear develops at the time of use (when the vehicle is traveling with the tire mounted) and there is the danger of a decline in durability. Patent Document 2 discloses an arrangement in which multiple steel wires are wrapped by an organic fiber rather than by a steel wrapping wire. However, since organic fiber has much less rigidity in comparison with steel, there is the danger that the force that maintains the parallel arrangement of the multiple steel wires will be inadequate. If the number of steel wires to be arrayed in parallel is large, loss of shape is especially likely to occur.

Arrangements in which multiple wires (filaments) are united in parallel with one another using an adhesive rather than a wrapping wire have been proposed (Patent Documents 3 and 4).

Maintaining multiple steel wires in a mutually parallel state using an adhesive rather than by winding a wrapping wire around them eliminates the need to consider the magnitude of binding force and the like that should be taken into consideration when use is made of a wrapping wire. If an adhesive is used, however, the adhesion between steel wires provided by the adhesive must be taken into account as a matter of course. In addition, since the adhesive lies between the steel cord and the rubber, it is necessary to consider the rubber adhesion with respect to the steel cord when the steel cord is embedded within the rubber (the belt layer). It is of course necessary to also consider the relationship between the adhesive strength afforded by the adhesive and the repulsive force of the steel cord (a force that flexure) in order to assure shape stability.

Patent Document 1: Japanese Patent Application Laid-Open No. 62-149929
Patent Document 2: Japanese Patent Application Laid-Open No. 2001-55008
Patent Document 3: Japanese Patent Application Laid-Open No. 63-240402
Patent Document 4: Japanese Patent Application Laid-Open No. 7-304307

DISCLOSURE OF THE INVENTION

An object of the present invention is to improve the durability and shape stability of steel cord.

A further object of the present invention is to prevent an extreme decline in rubber adhesion in a steel cord in which multiple steel wires are maintained in parallel with one another using an adhesive.

Yet another object of the present invention is to suppress, to the maximum extent, the repulsive force of a steel cord in which multiple steel wires are maintained in parallel with one another using an adhesive, and prevent the occurrence of a large amount of curling of a rubber sheet in which the steel cord has been embedded.

A steel cord in accordance with the present invention has an external form that is strip-shaped overall (a slender, planar shape), in which multiple brass-plated steel core wires arrayed in parallel with one another are bundled together with the parallel array being maintained intact. The strip-shaped steel cord according to the present invention is such that the wire diameter (cross-sectional diameter) of each of the core wires is less than 0.45 mm, the surface thereof is coated with an adhesive to a thickness of less than 15 μm, the multiple core wires are fixed together into a unitary body by the adhesive, the spacing between mutually adjacent core wires is less than 20 μm, and free coil diameter of each of the core wires [the diameter of a coil (a ring-shaped configuration) that forms naturally in the absence of an acting external force when the wire is left at rest on a flat surface] is greater than the wire diameter by 750 times or more.

In accordance with the present invention, multiple core wires are adhered together by an adhesive, whereby the parallel array of the multiple core wires is maintained. Since the core wires are fixed into a unitary body owing to the adhesion provided by the adhesive, there is no enlargement of contact pressure between the core wires and there is hardly any fretting wear caused by core wires rubbing against each other. A highly durable steel cord is provided.

The steel cord in accordance with the present invention is used upon being embedded within a rubber sheet. In order to heighten the adhesion between the steel cord and rubber, the surface of the core wires constituting the steel cord is plated with brass. In the steel cord according to the present invention, the thickness of the adhesive applied to the surface in order to fix the multiple core wires into a unitary body is made less than 15 μm. By making the thickness of the adhesive less than 15 μm, it is possible to suppress a decline in adhesion between the steel cord and the rubber that is ascribable to the interposition of the adhesive.

The steel cord in accordance with the present invention is constituted by core wires each having a wire diameter of less than 0.45 mm and a free coil diameter that is greater than the wire diameter by 750 times or more. When a curved (twisted) steel cord is embedded in a rubber sheet, the rubber sheet curls owing to the embedded steel cord. By using core wires each having a wire diameter of less than 0.45 mm and a free coil diameter that is greater than the wire diameter by 750 times or more, curling produced in the rubber sheet having the embedded steel cord can be made comparatively small.

The steel cord in accordance with the present invention is such that the spacing between mutually adjacent core wires is made less than 20 μm. By using core wires in which the spacing of the mutually adjacent core wires is less than 20 μm and the free coil diameter thereof is greater than the wire diameter by 750 times or more, separation of the adhered portions hardly occurs, the parallel array of the multiple core wires can be maintained and shape stability is improved.

It should be noted that if the wire diameter of each of the core wires is too small (the core wire is too slender), there is the possibility that the desired strength will not be attainable. It is preferred, therefore, that the wire diameter of each of the core wires be equal to or greater than 0.15 mm.

The present invention also provides a belt layer for tires in which the above-described steel cord is embedded, as well as a tire equipped with this belt layer.

BEST MODE FOR CARRYING OUT THE INVENTION

Figure 1:
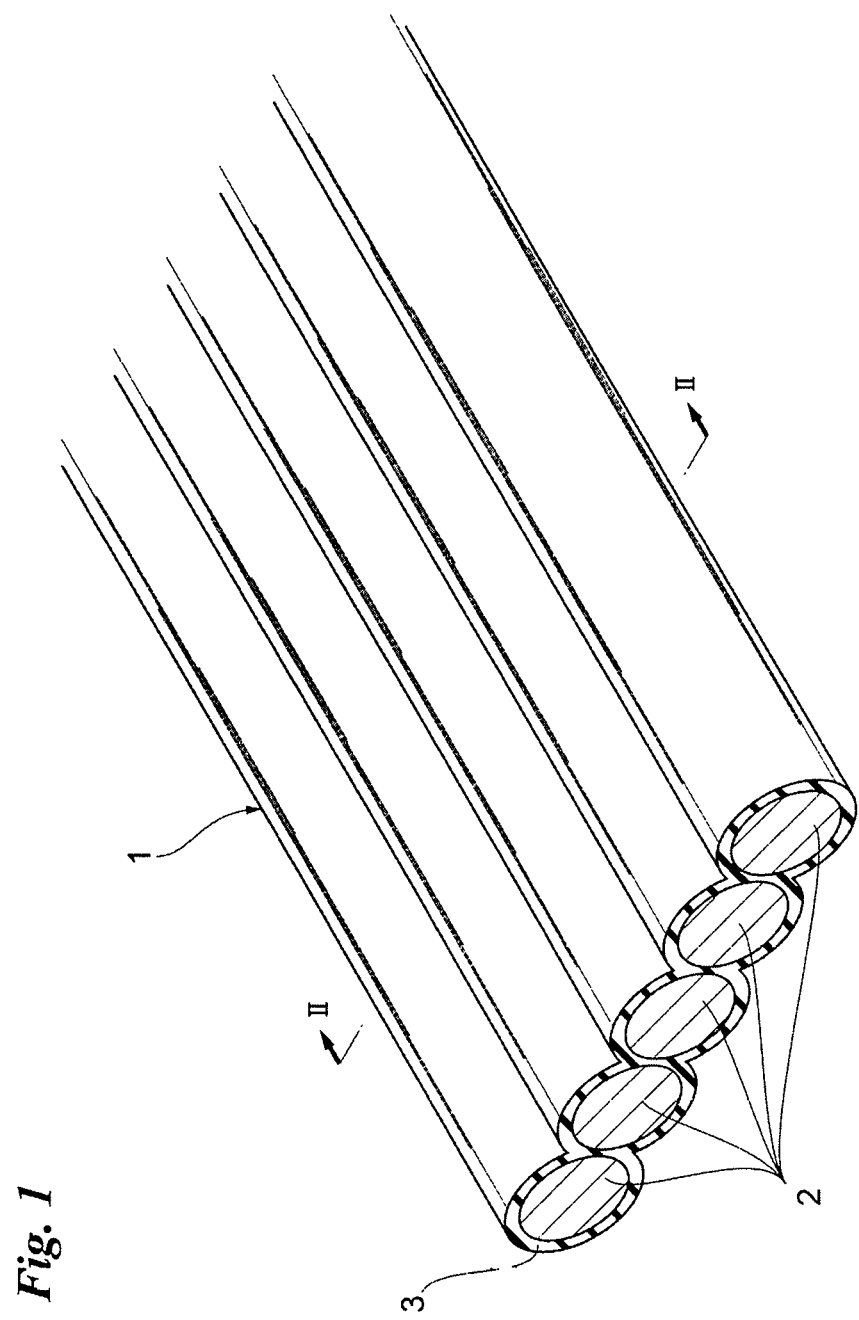
FIG. 1 is a partially enlarged perspective view of a strip-shaped steel cord.
Figure 2:
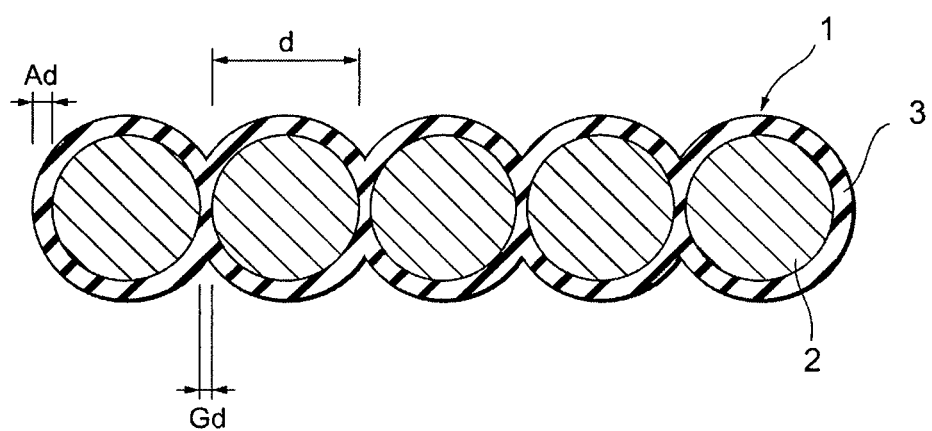
FIG. 2 is a sectional view of the strip-shaped steel cord taken along line II-II of FIG. 1.

FIG. 1, which illustrates an embodiment of the present invention, is a partially enlarged perspective view of a strip-shaped steel cord 1. FIG. 2 is a sectional view taken along line II-II of FIG. 1.

The strip-shaped steel cord 1 has five core wires 2 arrayed in parallel with one another in a plane, and an adhesive (adhesive layer) 3 which fixes the five core wires 2 into a unitary body and maintains the parallel array thereof. The core wires 2 are made of steel and contain carbon and iron. The adhesive 3 is rubber-based and has styrene-butadiene, nitrile, chloroprene or the like as its main ingredient.

Each of the core wires 2 constituting the strip-shaped steel cord 1 has a circular cross section with use being made of wire having a wire diameter (the cross-sectional diameter of the core wire 2) of 0.15 to 0.45 mm. For example, the core wire 2 is fabricated by subjecting piano wire having a wire diameter of 5.50 mm to dry wire drawing and heat treatment a required number of times, brass-plating the wire and then performing wet wire drawing in the order mentioned. The five core wires are arranged in parallel with one another in a plane without being twisted, are coated with the adhesive 3 and shaped to thereby produce the strip-shaped steel cord 1. Thickness Ad of the applied adhesive 3 is made less than 15 μm. If wire diameter d of the core wire 2 is 0.20 mm, for example, the width of the steel cord 1 will be about 1.00 mm. It should be understood that the perspective view of the strip-shaped steel cord 1 shown in FIG. 1 and the sectional view shown in FIG. 2 are illustrated in considerably enlarged form.

With reference to FIG. 2, there is a minute spacing Gd between the five adjacent core wires 2 constituting the strip-shaped steel cord 1, and the adhesive 3 is present in the gaps Gd as well. It should be noted that the adjacent core wires 2 may be made to contact each other along the longitudinal direction (in which case the spacing Gd between the mutually adjacent core wires would be 0). The spacing Gd between the mutually adjacent core wires is made less than 20 μm, as will be described later. In any case, the five core wires 2 constituting the strip-shaped steel cord 1 are fixed and united into a whole by the adhesive 3, enabling the parallel array to be stably maintained.

After the adhesive 3 hardens, the strip-shaped steel cord 1 is wound upon a reel and shipped to an automobile tire factory or the like.

Figure 3:
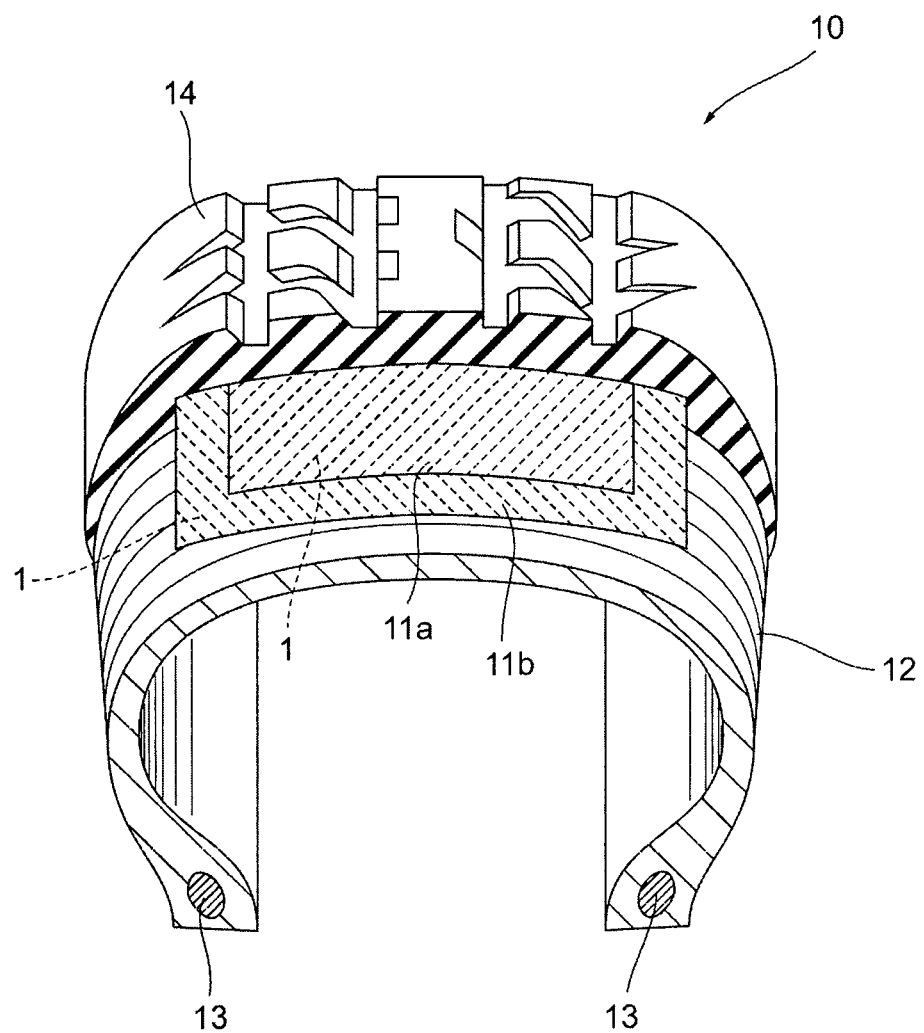
FIG. 3 is a sectional view illustrating the internal structure of a tire for automobiles.

FIG. 3 is a sectional view illustrating the structure of an automobile tire 10. The automobile tire 10 has a carcass 12 that will form the skeletal frame of the tire 10, annular beads situated at both ends of the carcass 12, and a tread portion 14 situated on the outermost layer of the automobile tire 10. Two belt layers 11a, 11b are situated between the carcass 12 and tread portion 14. The strip-shaped steel cord 1 is used upon being embedded in the belt layers 11a, 11b. The carcass 12 is tightened by the belt layers 11a, 11b, whereby the rigidity of the tire 10 is enhanced. Further, the belt layers 11a, 11b alleviate impact from the road surface and also prevent external damage from directly reaching the carcass 12.

The strip-shaped steel cord 1 described above was subjected to an evaluation test from a variety of standpoints. The evaluation test will be described in detail below.

Table 1 illustrates results of the evaluation test. Strip-shaped steel cords of multiple types obtained by making various changes in parameters (structure) described below were fabricated and each strip-shaped steel cord was subjected to the evaluation test.

TABLE 1

|  | WRAPPING | WIRE DIAMETER d | FREE COIL DIAMETER D | D/d | WIRE SPACING | ADHESIVE THICKNESS |
| --- | --- | --- | --- | --- | --- | --- |
| COMPARATIVE EXAMPLE 1 | STEEL | 0.2 mm | 200 mm | 1000 | 3 μm | — |
| COMPARATIVE EXAMPLE 2 | PA66 | 0.2 | 200 | 1000 | 5 | — |
| COMPARATIVE EXAMPLE 3 | PET | 0.2 | 200 | 1000 | 6 | — |
| COMPARATIVE EXAMPLE 4 | — | 0.2 | 100 | 500 | 15 | 10 μm |
| COMPARATIVE EXAMPLE 5 | — | 0.2 | 100 | 500 | 15 | 20 |
| COMPARATIVE EXAMPLE 6 | — | 0.2 | 100 | 500 | 20 | 10 |
| COMPARATIVE EXAMPLE 7 | — | 0.2 | 100 | 500 | 20 | 20 |
| COMPARATIVE EXAMPLE 8 | — | 0.2 | 140 | 700 | 15 | 10 |
| COMPARATIVE EXAMPLE 9 | — | 0.2 | 150 | 750 | 20 | 20 |
| COMPARATIVE EXAMPLE 10 | — | 0.2 | 200 | 1000 | 15 | 15 |
| COMPARATIVE EXAMPLE 11 | — | 0.2 | 200 | 1000 | 15 | 20 |
| COMPARATIVE EXAMPLE 12 | — | 0.2 | 200 | 1000 | 20 | 10 |
| COMPARATIVE EXAMPLE 13 | — | 0.2 | 200 | 1000 | 25 | 10 |
| COMPARATIVE EXAMPLE 14 | — | 0.3 | 210 | 700 | 5 | 13 |
| COMPARATIVE EXAMPLE 15 | — | 0.3 | 240 | 800 | 5 | 18 |

TABLE 1-continued

| | | | | | | |
|---|---|---|---|---|---|---|
| COMPARATIVE EXAMPLE 16 | — | 0.3 | 330 | 1100 | 15 | 20 |
| COMPARATIVE EXAMPLE 17 | — | 0.3 | 330 | 1100 | 20 | 13 |
| COMPARATIVE EXAMPLE 18 | — | 0.4 | 280 | 700 | 10 | 13 |
| COMPARATIVE EXAMPLE 19 | — | 0.4 | 300 | 750 | 10 | 15 |
| COMPARATIVE EXAMPLE 20 | — | 0.4 | 480 | 1200 | 15 | 20 |
| COMPARATIVE EXAMPLE 21 | — | 0.4 | 480 | 1200 | 20 | 20 |
| COMPARATIVE EXAMPLE 22 | — | 0.47 | 400 | 851 | 15 | 10 |
| COMPARATIVE EXAMPLE 23 | — | 0.47 | 500 | 1064 | 15 | 15 |
| COMPARATIVE EXAMPLE 24 | — | 0.47 | 500 | 1064 | 20 | 15 |
| COMPARATIVE EXAMPLE 25 | — | 0.5 | 350 | 700 | 20 | 10 |
| COMPARATIVE EXAMPLE 26 | — | 0.5 | 400 | 800 | 20 | 15 |
| COMPARATIVE EXAMPLE 27 | — | 0.5 | 500 | 1000 | 15 | 10 |
| COMPARATIVE EXAMPLE 28 | — | 0.5 | 550 | 1100 | 15 | 15 |
| COMPARATIVE EXAMPLE 29 | — | 0.5 | 550 | 1100 | 20 | 15 |
| EMBODIMENT 1 | — | 0.15 | 200 | 1333 | 15 | 10 |
| EMBODIMENT 2 | — | 0.2 | 150 | 750 | 15 | 10 |
| EMBODIMENT 3 | — | 0.2 | 160 | 800 | 15 | 10 |
| EMBODIMENT 4 | — | 0.2 | 200 | 1000 | 15 | 10 |
| EMBODIMENT 5 | — | 0.2 | 200 | 1000 | 15 | 13 |
| EMBODIMENT 6 | — | 0.2 | 200 | 1000 | 15 | 14 |
| EMBODIMENT 7 | — | 0.2 | 200 | 1000 | 18 | 10 |
| EMBODIMENT 8 | — | 0.2 | 200 | 1000 | 19 | 10 |
| EMBODIMENT 9 | — | 0.3 | 300 | 1000 | 15 | 10 |
| EMBODIMENT 10 | — | 0.4 | 400 | 1000 | 15 | 10 |
| EMBODIMENT 11 | — | 0.45 | 340 | 756 | 15 | 10 |
| EMBODIMENT 12 | — | 0.45 | 400 | 889 | 15 | 10 |

| | SHAPE STABILITY | RUBBER ADHESION | DURABILITY | FRETTING RESISTANCE | AH | H |
|---|---|---|---|---|---|---|
| COMPARATIVE EXAMPLE 1 | ○ | ○ | 100 | X | 12 mm | 0 mm |
| COMPARATIVE EXAMPLE 2 | X | ○ | 105 | ○ | 14 | 0 |
| COMPARATIVE EXAMPLE 3 | X | ○ | 103 | ○ | 14 | 0 |
| COMPARATIVE EXAMPLE 4 | X | ○ | 112 | ○ | 47 | 9 |
| COMPARATIVE EXAMPLE 5 | X | X | 112 | ○ | 47 | 9 |
| COMPARATIVE EXAMPLE 6 | X | ○ | 111 | ○ | 48 | 9 |
| COMPARATIVE EXAMPLE 7 | X | X | 111 | ○ | 47 | 9 |
| COMPARATIVE EXAMPLE 8 | X | ○ | 113 | ○ | 40 | 6 |
| COMPARATIVE EXAMPLE 9 | X | X | 112 | ○ | 31 | 3 |
| COMPARATIVE EXAMPLE 10 | ○ | X | 114 | ○ | 15 | 1 |
| COMPARATIVE EXAMPLE 11 | ○ | X | 113 | ○ | 15 | 1 |
| COMPARATIVE EXAMPLE 12 | X | ○ | 112 | ○ | 16 | 1 |
| COMPARATIVE EXAMPLE 13 | X | ○ | 110 | ○ | 16 | 1 |
| COMPARATIVE EXAMPLE 14 | X | ○ | 114 | ○ | 41 | 6 |
| COMPARATIVE EXAMPLE 15 | ○ | X | 115 | ○ | 31 | 3 |
| COMPARATIVE EXAMPLE 16 | ○ | X | 113 | ○ | 22 | 1 |
| COMPARATIVE EXAMPLE 17 | X | ○ | 112 | ○ | 23 | 1 |
| COMPARATIVE EXAMPLE 18 | X | ○ | 112 | ○ | 44 | 7 |
| COMPARATIVE EXAMPLE 19 | ○ | X | 115 | ○ | 36 | 4 |
| COMPARATIVE EXAMPLE 20 | ○ | X | 114 | ○ | 28 | 1 |
| COMPARATIVE EXAMPLE 21 | X | X | 112 | ○ | 28 | 1 |
| COMPARATIVE EXAMPLE 22 | ○ | ○ | 115 | ○ | 50 | 10 |
| COMPARATIVE EXAMPLE 23 | ○ | X | 115 | ○ | 49 | 10 |
| COMPARATIVE EXAMPLE 24 | X | X | 114 | ○ | 49 | 10 |
| COMPARATIVE EXAMPLE 25 | X | ○ | 113 | ○ | 54 | 17 |
| COMPARATIVE EXAMPLE 26 | X | X | 113 | ○ | 53 | 15 |
| COMPARATIVE EXAMPLE 27 | ○ | ○ | 116 | ○ | 52 | 14 |
| COMPARATIVE EXAMPLE 28 | ○ | X | 115 | ○ | 52 | 14 |
| COMPARATIVE EXAMPLE 29 | X | X | 113 | ○ | 52 | 14 |
| EMBODIMENT 1 | ○ | ○ | 109 | ○ | 8 | 0 |
| EMBODIMENT 2 | ○ | ○ | 113 | ○ | 31 | 3 |
| EMBODIMENT 3 | ○ | ○ | 112 | ○ | 27 | 2 |
| EMBODIMENT 4 | ○ | ○ | 113 | ○ | 15 | 1 |
| EMBODIMENT 5 | ○ | ○ | 115 | ○ | 15 | 1 |
| EMBODIMENT 6 | ○ | ○ | 113 | ○ | 15 | 1 |
| EMBODIMENT 7 | ○ | ○ | 112 | ○ | 16 | 1 |
| EMBODIMENT 8 | ○ | ○ | 111 | ○ | 16 | 1 |
| EMBODIMENT 9 | ○ | ○ | 116 | ○ | 24 | 1 |
| EMBODIMENT 10 | ○ | ○ | 116 | ○ | 34 | 2 |
| EMBODIMENT 11 | ○ | ○ | 114 | ○ | 39 | 5 |
| EMBODIMENT 12 | ○ | ○ | 114 | ○ | 39 | 5 |

(1) Presence or Absence of Wrapping Wire

Samples of strip-shaped steel cords were fabricated, these being obtained by winding a wrapping wire helically about the periphery of five core wires 2 to unit the wires in the manner of the prior art (for example, see Japanese Patent Application Laid-Open No. 62-149929) rather than uniting them by the adhesive 3 (Comparative Examples 1 to 3). A steel wrapping wire was used in Comparative Example 1, a PA66 (polyamide 66) wrapping wire in Comparative Example 2, and a PET (polyethylene-terephthalate) wrapping wire in Comparative Example 3. All samples other than Comparative Examples 1 to 3 (namely Comparative Examples 4 to 29 and Embodiments 1 to 12) were strip-shaped steel cords 1 (FIGS. 1 and 2) in which the five core wires 2 were united by the adhesive 3 without using wrapping wire.

(2) Wire Diameter d

Wire diameter is the wire diameter (cross-sectional diameter) of the core wire 2. The strip-shaped steel cords 1 were fabricated changing the wire diameter d of the core wire 2 (see FIG. 2) over a range of 0.15 to 0.5 mm.

(3) Free Coil Diameter D

Free coil diameter refers to the diameter of a coil (a ring-shaped configuration) that forms naturally in the absence of an acting external force when the wire is left at rest on a flat surface. The core wire 2 is fabricated through a wire drawing process, as described above, and develop kinks when passing through the die used in the drawing process. As a consequence, the core wire does not necessarily assume a linear shape when not being acted upon by an external force. The free coil diameter can be controlled by controlling the shape of the wire-drawing exit of the die and by adjusting the angle of the die. In the evaluation test, the free coil diameter was changed over a range of 100 to 550 mm.

(4) Free Coil Diameter/Wire Diameter (D/d)

This is a so-called spring index which, in this embodiment, is used to express the repulsive force of the core wire 2 (a force producing flexure and deviating away from the linear state) by a numerical value. This is a value obtained by dividing the above-mentioned free coil diameter D by the wire diameter d.

(5) Wire Spacing

This is the spacing Gd between mutually adjacent core wires 2 (see FIG. 2). In the evaluation test, the strip-shaped steel cords 1 were fabricated changing the wire spacing Gd over a range of 3 to 25 μm.

(6) Adhesive Thickness

This is thickness Ad of the adhesive 3 applied to the surface of the core wires 2 (see FIGS. 1 and 2). The adhesive thickness was changed over a range of 10 to 20 μm. The above-mentioned wire spacing Gd and adhesive thickness Ad were measured using sectional photographs obtained by enlarged imaging of the cross section of the fabricated strip-shaped steel cord 1.

Table 1 illustrates six types of evaluation, namely "SHAPE STABILITY", "RUBBER ADHESION", "DURABILITY", "FRETTING RESISTANCE", "ΔH" (curling evaluation value)" and "H" (sheet-flatness evaluation value).

(A) Evaluation of Shape Stability

Figure 4:
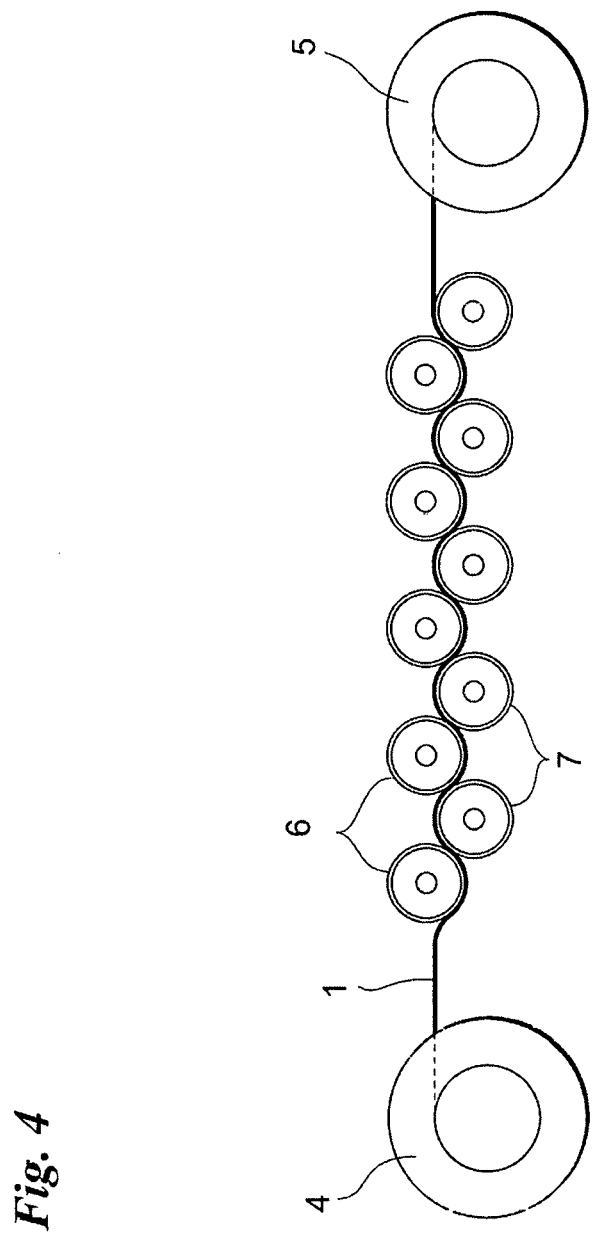
FIG. 4 schematically illustrates a testing machine used in evaluating shape stability.

The strip-shaped steel cord 1 is required to be one that can maintain its shape continuously until the rubber and the strip-shaped steel cord 1 are adhered together in a calendaring process. Evaluation of shape stability was carried out using a testing apparatus shown in FIG. 4. The testing apparatus includes a supply reel 4 for supplying the steel cord 1, a take-up reel 5 for taking up the steel cord 1, five upper-stage guide rolls 6 of diameter 50 mm provided at intervals on a straight line between the two reels 4 and 5, and five lower-stage guide rolls 7 of diameter 50 mm provided at intervals on a straight line between the two reels 4 and 5. The height positions of the upper-stage guide rolls 6 and lower-stage guide rolls 7 were adjusted in such a manner that 6 mm of vertical motion (pressing force) was applied to the steel cord 1 when the steel cord 1 passed between the upper-stage guide rolls 6 and lower-stage guide rolls 7. The steel cord 1 was supplied from the supply reel 4 at a supply tension of 2 kgf, was passed between the guide rolls 6, 7 at a speed of 30 m/min and was wound up on the take-up reel 5. Thereafter the steel cord 1 was visual inspected. In the shape-stability evaluation column of Table 1, an "x" is indicated with regard to samples for which loss of shape of the steel cord 1, such as separation of adhesive (disorder in the parallel array), was confirmed, and an "o" is indicated with regard to samples for which loss of shape was not confirmed. In this specification, the symbols "o" and "x" are used to express a high evaluation (or that the sample is suitable) and a low evaluation (or that the sample is unsuitable), respectively.

(B) Evaluation of Rubber Adhesion

The belt layers 11a, 11b in which the strip-shaped steel cord 1 was embedded were made of rubber. It is required that the steel cord 1 adhere to the belt layers (rubber) 11a, 11b favorably. As mentioned above, the surface of the core wires 2 constituting the strip-shaped steel cord 1 were brass-plated. If the core wires 2 and belt layers 11a, 11b are in direct contact, the core wires and belt layers will adhere together favorably because an interfacial reaction occurs at the time of vulcanization (vulcanizing molding performed at the final stage of the tire manufacturing process) owing to copper contained in the brass plating and sulfur contained in the rubber. However, since the strip-shaped steel cord 1 was provided on its outermost surface with the adhesive 3, as described above (see FIGS. 1 and 2), the core wires 2 (the brass plating layer on the surface thereof) and the belt layers 11a, 11b (rubber) do not come into direct contact. Accordingly, the adhesion between the strip-shaped steel cord 1 and the belt layers 11a, 11b must be carefully ascertained. The evaluation of rubber adhesion means, in other words, evaluation of the adhesion between the strip-shaped steel cord 1 and the belt layers 11a, 11b. The evaluation of rubber adhesion was performed in line with ASTM (American Society of Testing and Materials) D2229. Specifically, the periphery of the strip-shaped steel cord 1 was covered with rubber, the rubber was subjected to vulcanizing molding, the steel cord 1 was pulled out of the vulcanized rubber and the percentage of the area of the surface of the extracted steel cord 1 covered with the rubber (the rubber coverage) was measured. In the rubber adhesion evaluation column of Table 1, an "o" is indicated with regard to samples for which the rubber coverage was 75% or greater, and an "x" is indicated with regard to samples for which the rubber coverage was less than 75%.

(C) Evaluation of Durability and Evaluation of Fretting Resistance

Figure 5:
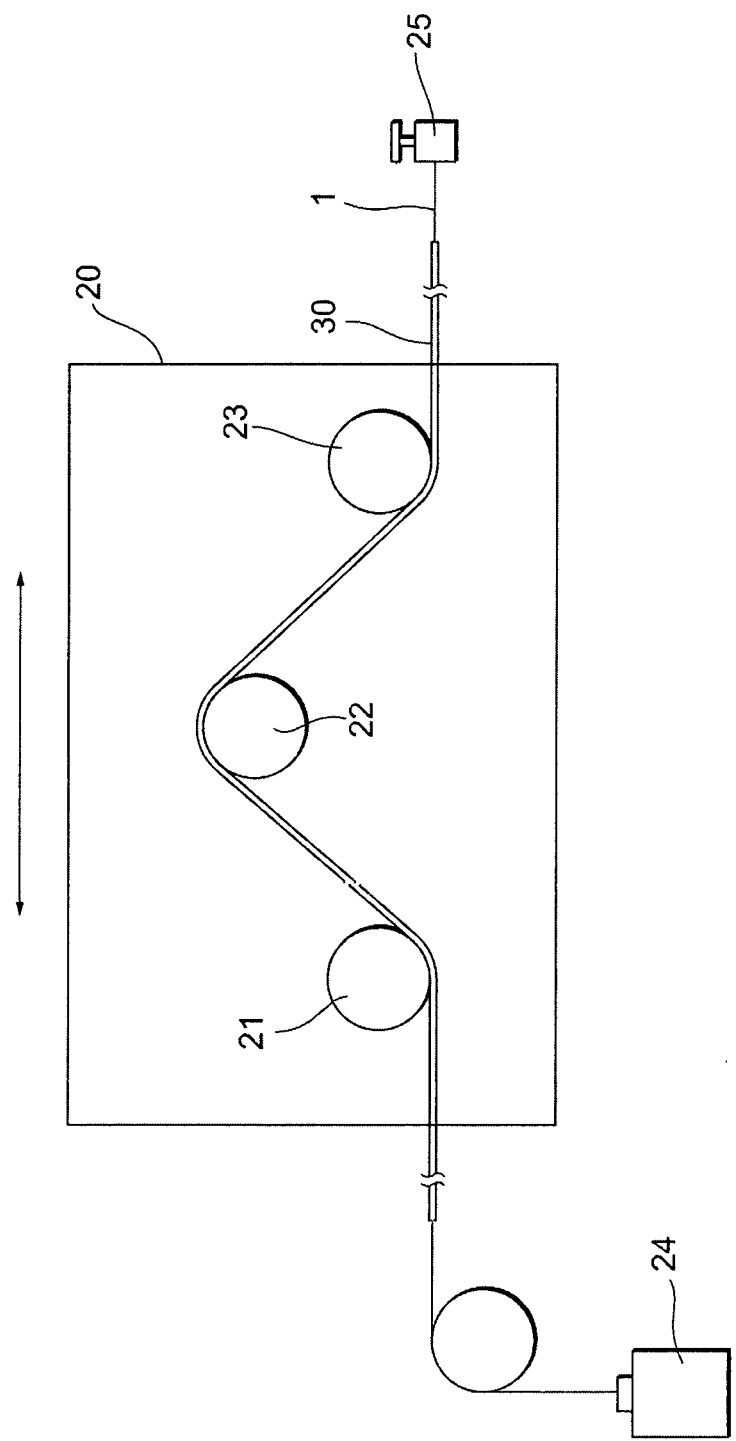
FIG. 5 schematically illustrates a three-roll testing machine.
Figure 6:
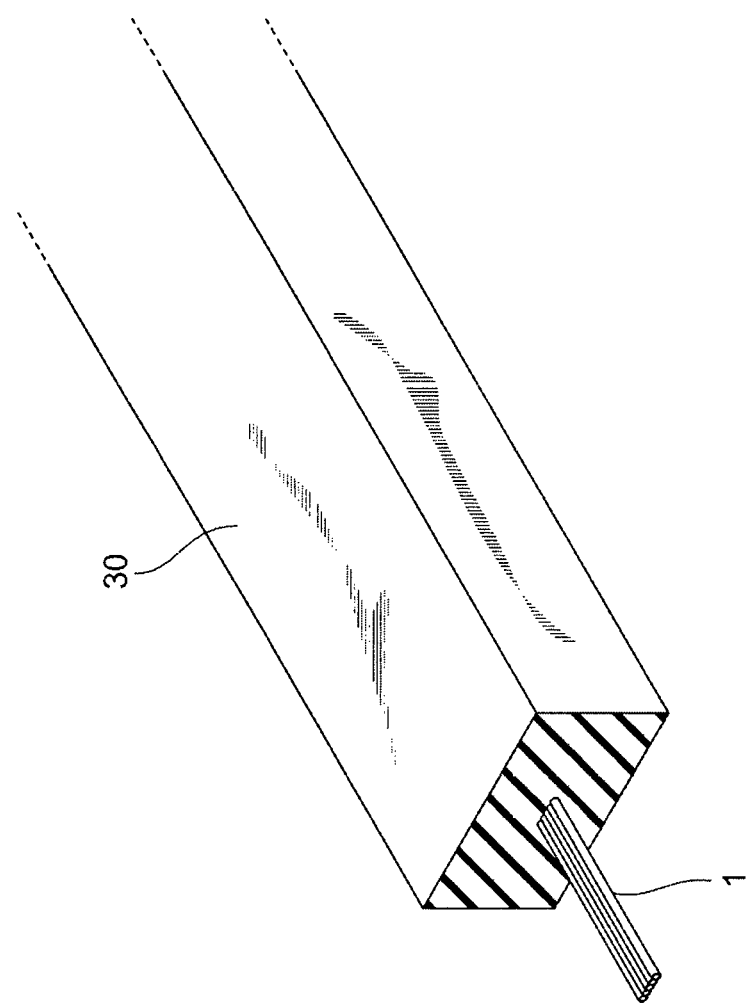
FIG. 6 is a perspective view of a test piece in a three-roll test.

If the strip-shaped steel cord 1 embedded in the belt layers 11a, 11b of the automobile tire 10 snaps (breaks), the strip-shaped steel cord 1 will no longer function as a reinforcing member for the automobile tire 10. Rubbing between the core wires 2 that constitute the steel cord 1 and mutually sustained wear can cause the strip-shaped steel cord 1 to snap. The evaluations of durability and fretting resistance were conducted using a three-roll testing machine shown in FIG. 5 and a test piece 30 shown in FIG. 6 in enlarged form.

The three-roll testing machine has a driving unit 20 that includes a total of three freely rotatable rolls, namely two freely rotatable rolls 21, 23 disposed on a straight line, and a freely rotatable roll 22 disposed between the freely rotatable rolls 21, 23 at a position offset from the straight line. The test piece 30 in which the steel cord 1 was embedded (see FIG. 6) was engaged with the rolls 21, 22, 23 of the driving unit 20 and the driving unit 20 (the three rolls 21, 22, 23) were moved back and forth along the direction of the straight line. The rolls 21, 22, 23 used had a diameter expressed by roll diameter D/core wire diameter d=100. An angle of about 60° was formed between the central roll 22 and rolls 21, 23 on both sides. The driving unit 20 was moved back and forth at a speed of 320 cycles/min, and one stroke was 180 mm. The test piece 30 was obtained by covering the strip-shaped steel cord 1, which had an overall length of 1200 mm, with rubber in quadrate form having a length of 350 mm, a height of 4.5 mm and a width of 9.5 mm. The strip-shaped steel cord 1 was exposed at both ends of the test piece 30. One end of the strip-shaped steel cord 1 was screwed securely to a fixture 25 and a weight 24 exerting a load that was 10% of the severance load of strip-shaped steel cord 1 was suspended from the other end.

In the durability evaluation column of Table 1, the number of reciprocations (the number of total-rupture cycles) of the driving unit 20 obtained at rupture of the entire strip-shaped steel cord 1 embedded in the test piece 30 is indicated by an index with Comparative Example 1 serving as 100. With regard to the fretting-resistance evaluation column of Table 1, testing was halted at a cycle count that was 80% of the number of total-rupture cycles obtained in the durability evaluation test, the test piece 30 was taken apart and the absence or presence of wear on the surface of the steel cord 1 was observed. The results are shown in the fretting-resistance evaluation column of Table 1. An "x" is indicated with regard to a sample for which wear was confirmed, and an "o" is indicated with regard to samples for which wear was not confirmed.

(D) Winding Kink Evaluation (Cord Curvature Quantity AH)

Figure 7:
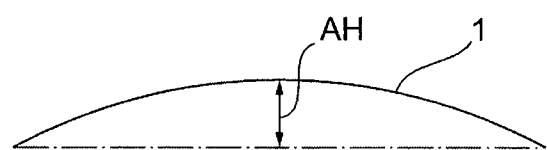
FIG. 7 illustrates a point where amount of curvature is measured in a winding-kink evaluation test.

Since the core wire 2 constituting the strip-shaped steel cord 1 is fabricated through a wire drawing process, as described above, the core wire will not necessarily be linear when an external force is not acting upon them. Further, since the strip-shaped steel cord 1 obtained by fixing the five core wires 2 in a state in which they are arranged in parallel is shipped and stored, etc., in a state in which it is wound upon a reel, as mentioned above, the steel cord is imparted with kinks while it is being wound upon the reel. If the strip-shaped steel cord 1 develops a large amount of winding kink, there are instances where curling occurs in a calendar sheet at a preliminary stage for manufacture of the belt layers 11*a*, 11*b*. If the calendar sheet curls, there is the danger that an impediment will occur in the process for manufacturing the belt layers 11*a*, 11*b* from the calendar sheet. The strip-shaped steel cord 1 was wound at a tension of 1.2 kgf upon a reel having a drum diameter of 114 mm, this was left standing for two weeks and the strip-shaped steel cord 1 was then fed from the reel. The amount of curvature of this strip-shaped steel cord 1 is indicated in the AH column of Table 1. With the strip-shaped steel cord 1 cut to 400 mm as shown in FIG. 7 placed on a flat surface, the curvature quantity AH is the distance from the intersection between a straight line, which connects both ends of the strip-shaped steel cord 1 and a perpendicular dropped from the apex of the strip-shaped steel cord 1, to the apex. AH was measured in compliance with JIS (Japan Industrial Standards) G3510. AH values equal to or greater than 40 mm are indicated by boldface characters in the AH column of Table 1.

(E) Evaluation of Sheet Flatness (Sheet Uplift Quantity H)

If the strip-shaped steel cord 1 develops a large amount of winding kink, the calendar sheet in which the steel cord has been embedded will curl, as mentioned above. In the evaluation of sheet flatness, what was evaluated was the extend of curling of a rubber sheet covering the strip-shaped steel cord 1 (after it was wound upon a reel having a drum diameter of 114 mm and left standing for two weeks). An unvulcanized rubber sheet of length 1000 mm×width 100 mm×thickness 0.5 mm was wound upon a drum having a circumference of 1000 mm (and a diameter of about 320 mm), and the strip-shaped steel cord 1 was wound regularly upon the unvulcanized rubber sheet at a tension of 2 kgf. An unvulcanized rubber sheet of the same size was further wound upon the steel cord from above to thereby sandwich the strip-shaped steel cord 1. This was followed by crimping at a load of 6 kgf using a roll to thereby fabricate a composite sheet 40. The composite sheet 40 was cut in a direction perpendicular to the cord, the composite sheet 40 was taken off the drum and left at rest on a flat surface, then the amount of uplift (distance from the flat surface) at the four corners of the composite sheet 40 was measured.

Figure 8A:
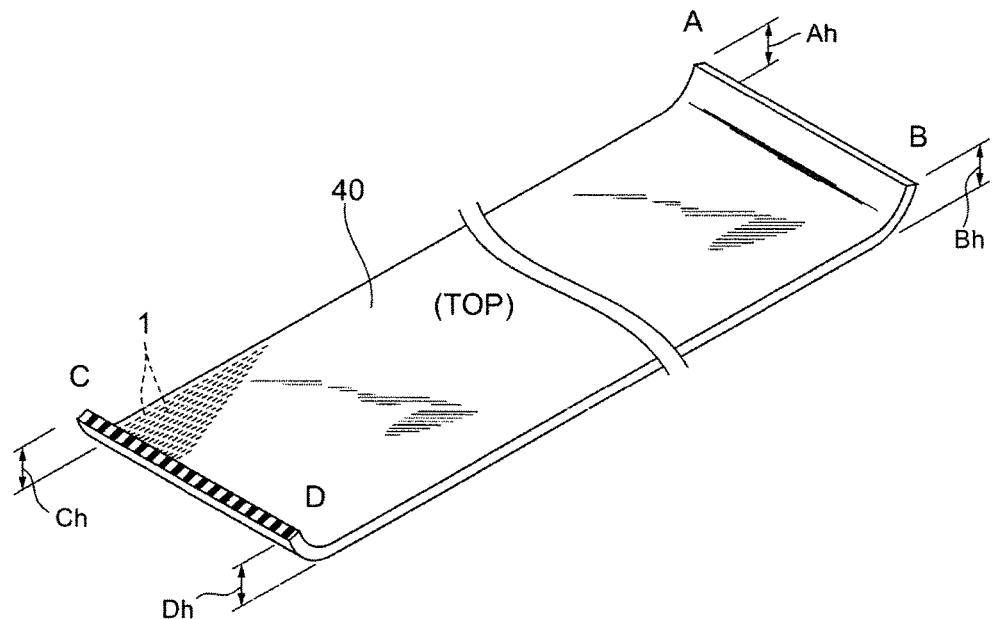
FIG. 8A is a perspective view illustrating a composite sheet, which is used in a flatness evaluation test, from a top side.
Figure 8B:
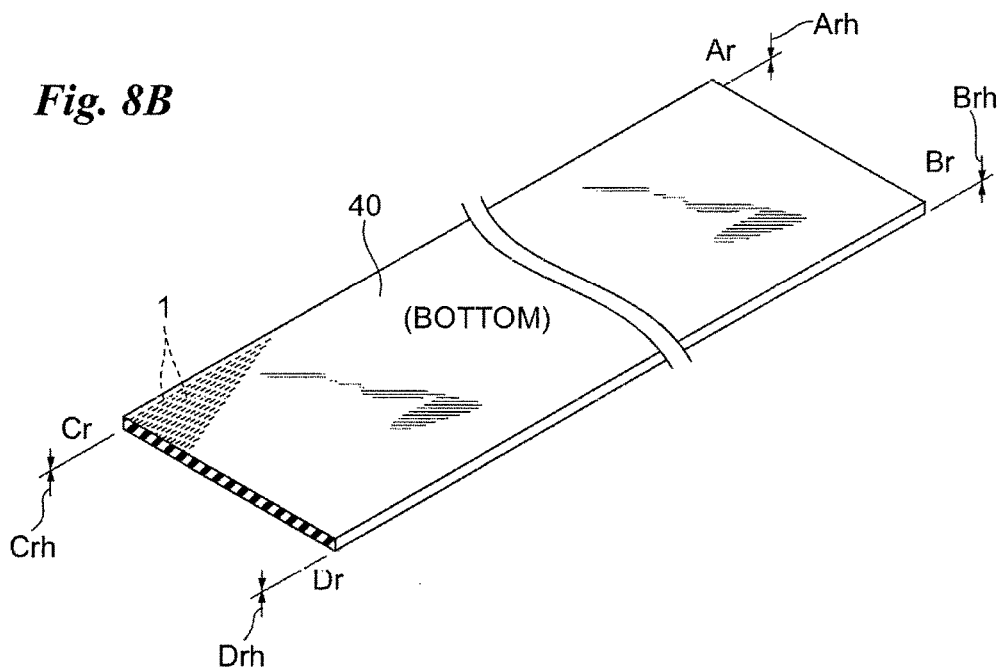
FIG. 8B is a perspective view illustrating the composite sheet, which is used in the flatness evaluation test, from a bottom side.

FIG. 8A is a perspective view of the composite sheet 40. FIG. 8B illustrates the composite sheet 40 of FIG. 8A after it has been turned over. In order to facilitate understanding, characters reading "TOP" are shown on the composite sheet 40 of FIG. 8A and characters reading "BOTTOM" are shown on the composite sheet 40 of FIG. 8B. The composite sheet 40 illustrated in FIG. 8A is such that an AB end and a CD end thereof are curled upward (this is somewhat emphasized in the drawing). By contrast, the turned-over composite sheet 40 shown in FIG. 8B is substantially free of curling. The reason for this is that, when the composite sheet 40 with its ends curled upwardly as shown in FIG. 8A is turned over and left at rest on a flat surface, the sheet comes to lie flat along the flat surface owing to dead weight of the composite sheet 40.

Let Ah, Bh, Ch and Dh represent the amounts of uplift (distances from the flat surface) of four corners A, B, C and D, respectively, of the composite sheet 40 that has not been turned over (FIG. 8A). Let Arh, Brh, Crh and Drh represent the amounts of uplift of the four corners A, B, C and D, respectively, of the composite sheet 40 that has been turned over (FIG. 8B). A value calculated according to the following equation is used as the uplift quantity H of the composite sheet 40:

$$H=(Ah+Bh+Ch+Dh+Arh+Brh+Crh+Drh)/4$$

Numerical values of the uplift quantity H calculated according to the above-cited calculation equation are indicated in the H column of Table 1. Further, numerical values of the uplift quantity H that exceed 5 mm are represented by the boldface characters.

With reference to the evaluation column for fretting resistance in Table 1, it will be seen that the evaluation of fretting resistance was "x" for the strip-shaped steel cord (Comparative Example 1) obtained by helically winding the steel wrapping wire about the periphery of the five core wires 2 arrayed in parallel. It is believed that this is on account of strong tightening of the core wires 2 by the steel wrapping wire, which results in the core wires 2 rubbing strongly against one another. The evaluation of fretting resistance was "o" for all of the strip-shaped steel cords (Comparative Examples 2 and 3) obtained by helically winding wrapping wire made of PA66 or PET and strip-shaped steel cords (Comparative Examples 3 to 29 and Embodiments 1 to 12) obtained by fixing the five core wires into a unitary body by adhesive.

With reference to the durability evaluation column of Table 1, it is assumed that "100" is the durability of the strip-shaped steel cord obtained by winding steel wrapping wire of Comparative Example 1. It will be seen that the durabilities of the strip-shaped steel cords (Comparative Examples 2 and 3), which were obtained by helically winding wrapping wire made of PA66 or PET, and of the strip-shaped steel cords (Comparative Examples 3 to 29 and Embodiments 1 to 12), which were obtained by fixing the five core wires 2 into a unitary body by adhesive, all exceeded "100". Further, it was confirmed that the strip-shaped steel cords 1 (Comparative Examples 3 to 29 and Embodiments 1 to 12) obtained by fixing the five core wires 2 into a unitary body by adhesive exhibit better durability than the strip-shaped steel cords (Comparative Examples 2 and 3) obtained by helically winding wrapping wire made of PA66 or PET.

It was confirmed that the durability and fretting resistance of the strip-shaped steel cord 1 can be improved more by fixing the core wires 2 into a unitary body using adhesive than by fixing the core wires 2 into a unitary body using wrapping wire.

Next, with reference to the shape-stability evaluation column of Table 1, it will be seen that although the evaluation of shape stability was "o" when steel wire was used as the wrapping wire (Comparative Example 1), the evaluation of shape stability was "x" when PA66 or PET wire was used as the wrapping wire (Comparative Examples 2, 3). It is believed that PA66 and PET exert insufficient force for maintaining the five core wires 2 in the parallel-arrayed state.

On the other hand, with regard to the strip-shaped steel cords 1 (Comparative Examples 3 to 29 and Embodiments 1 to 12) obtained by fixing the five core wires 2 into a unitary body by adhesive, it was confirmed that the evaluation of shape stability is affected by the values of free coil diameter/wire diameter (D/d) and wire spacing Gd.

Figure 9:
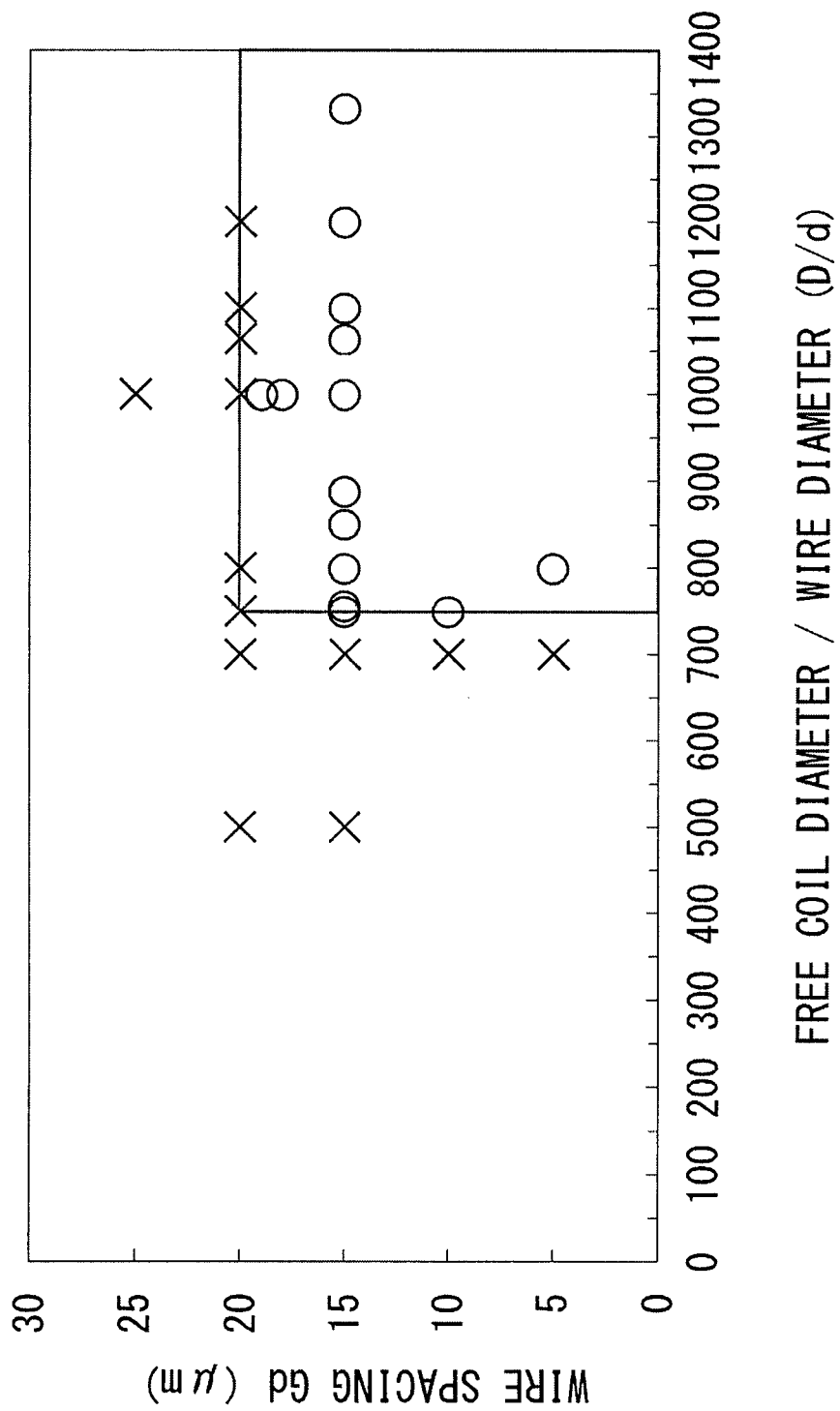
FIG. 9 is a graph relating to evaluation of shape stability.

FIG. 9 illustrates shape stability evaluation (o or x) regarding the Comparative Examples 3 to 29 and Embodiments 1 to 12, which are shown in Table 1, plotted on a graph in which the horizontal axis indicates free coil diameter/wire diameter (D/d) and the vertical axis indicates wire spacing Gd.

With reference to the graph of FIG. 9, the evaluation of shape stability is "x" when the value of D/d is less than 750. Further, the evaluation of shape stability is "x", even if the value of D/d is equal to or greater than 750, when the wire spacing is equal to or greater than 20 μm. It was confirmed that when the value of D/d is equal to or greater than 750 (the free coil diameter D of the core wire 2 is greater than the wire diameter d by 750 times or more) and, moreover, the wire spacing is less than 20 μm, shape stability of the strip-shaped steel cord 1 is achieved. Specifically, in order to assure the binding force between the core wires 2 resulting from the adhesive 3 and maintain shape stability, it is required that the repulsive force of the core wires not be made too large (that core wire 2 having a small D/d not be used), and it is required that the wire spacing Gd between the core wires 2 not be made too great.

Next, with reference to the rubber-adhesion evaluation column, it was confirmed that the evaluation of rubber adhesion is influenced by the thickness Ad of the adhesive 3.

Figure 10:
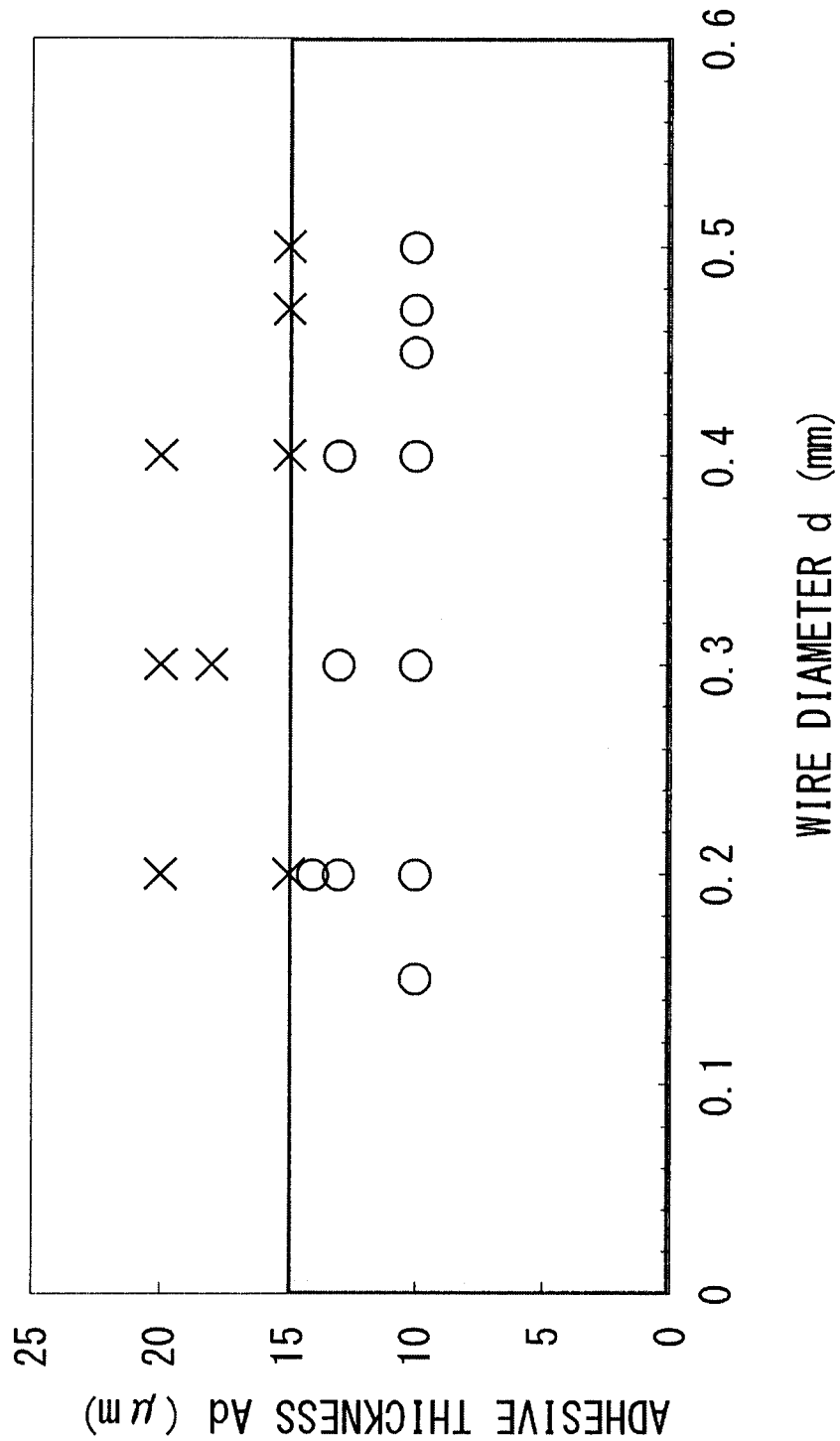
FIG. 10 is a graph relating to evaluation of rubber adhesion.

FIG. 10 is a plot of evaluation of rubber adhesion (o or x) regarding the Comparative Examples 3 to 29 and Embodiments 1 to 12, which are shown in Table 1, on a graph in which the horizontal axis indicates wire diameter d and the vertical axis indicates thickness Ad of the adhesive 3. The evaluation of rubber adhesion is "x" when the thickness of the adhesive 3 is equal to or greater than 15 μm. On the other hand, the evaluation of rubber adhesion is "o" when the thickness of the adhesive 3 is less than 15 μm. Although it was found that the reaction between the surface (the layer of brass plating) of the core wires 2 and rubber is impeded by the presence of the adhesive 3, it was confirmed that the impediment to the reaction is comparatively suppressed by limiting the thickness of the adhesive 3 to less than 15 μm.

Figure 11:
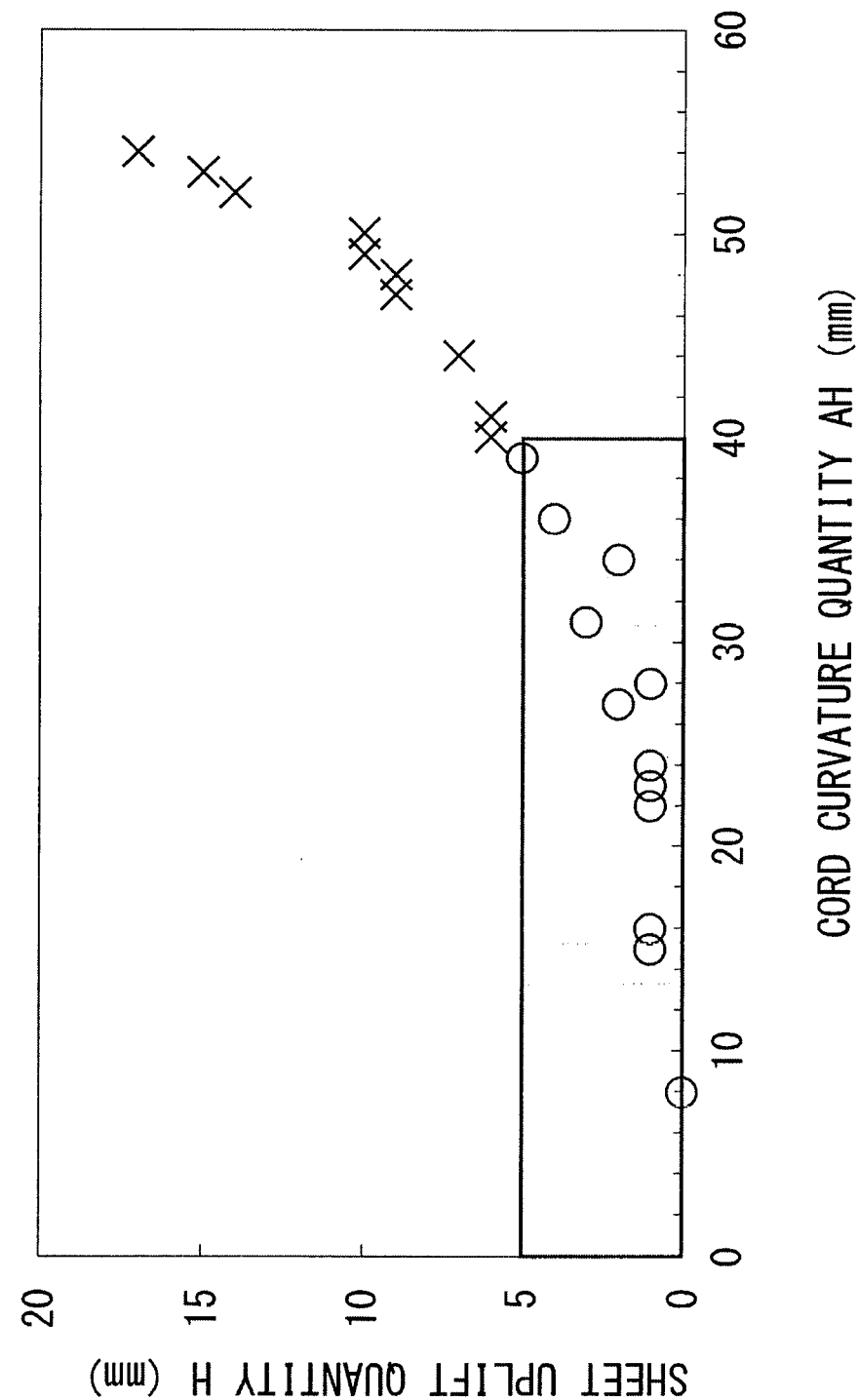
FIG. 11 is a graph relating to sheet flatness.
Figure 12:
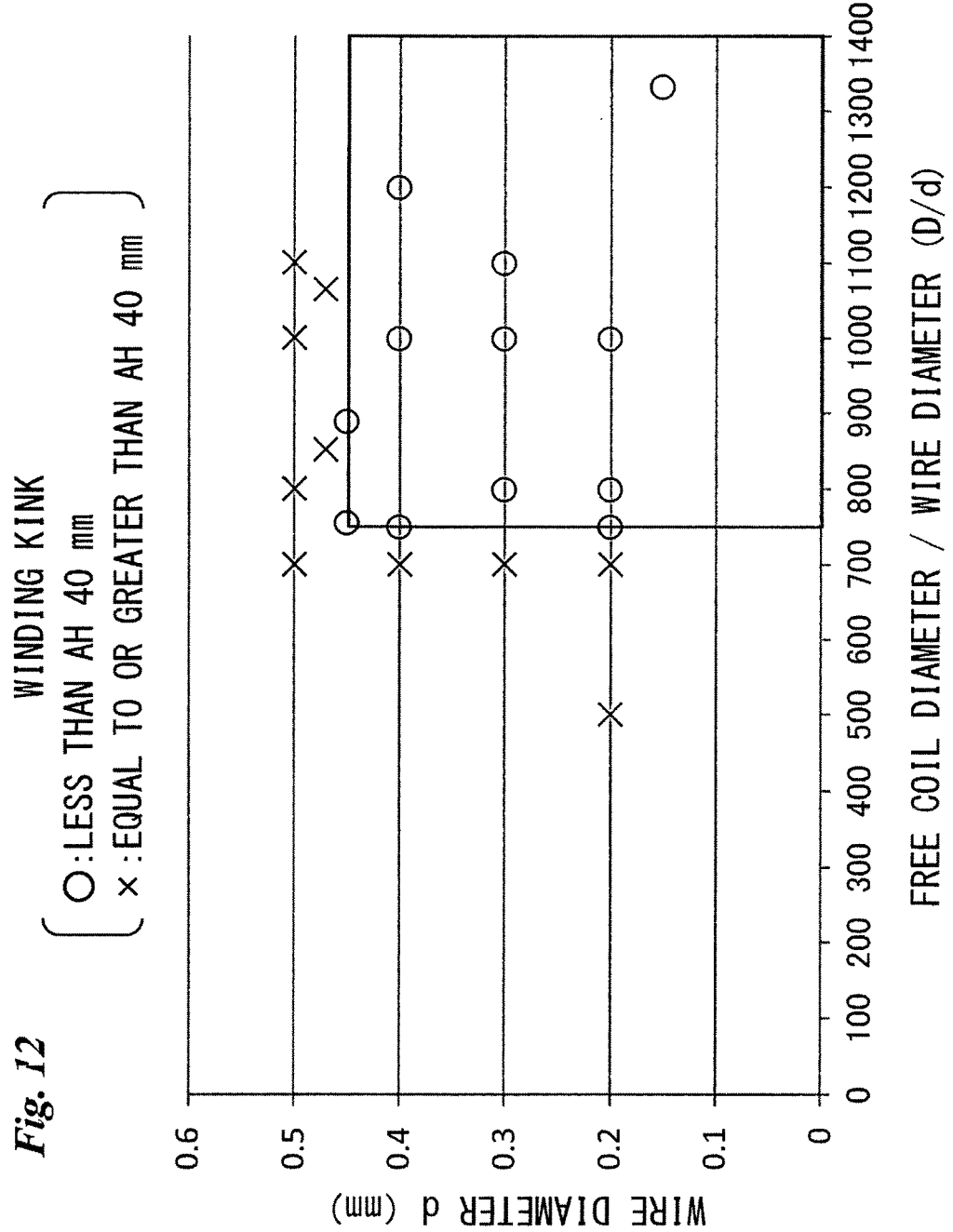
FIG. 12 is a graph relating to evaluation of winding kink.

FIG. 11 illustrates a graph relating to evaluation of sheet flatness based upon the test results in Table 1. On the graph, in which the horizontal axis indicates the curvature quantity AH of the strip-shaped steel cord 1 and the vertical axis indicates the sheet uplift quantity, "x" is plotted with regard to steel cord for which the sheet uplift quantity H exceeds 5 mm and "o" is plotted with regard to steel cord for which the sheet uplift quantity H is equal to or less than 5 mm. FIG. 12 illustrates a graph relating to evaluation of winding kink. On the graph, in which the horizontal axis indicates the free coil diameter/wire diameter (D/d) and the vertical axis indicates the wire diameter d, "x" is plotted with regard to steel cord for which the curvature quantity AH is equal to or greater than 40 mm and "o" is plotted with regard to steel cord for which the curvature quantity AH is less than 40 mm.

With reference to FIG. 11, the sheet uplift quantity H exceeds 5 mm for a composite sheet 40 (see FIGS. 8A, 8B) using the strip-shaped steel cord 1 having a curvature quantity AH (see FIG. 7) equal to or greater than 40 mm. Further, it was confirmed that when the curvature quantity AH of the strip-shaped steel cord 1 exceeds 40 mm, the sheet uplift quantity H of the composite sheet 40 starts to increase sharply. The sheet uplift quantity H falls below 5 mm if the curvature quantity AH is less than 40 mm. It was confirmed that the sheet uplift quantity H is strongly dependent the curvature quantity AH of the strip-shaped steel cord 1.

With reference to FIG. 12, the curvature quantity AH of the strip-shaped steel cord 1 is equal to or greater than 40 mm when the value of the free coil diameter/wire diameter (D/d) is less than 750 or the wire diameter is equal to or greater than 0.45 mm. It was confirmed that if the value of the free coil diameter/wire diameter (D/d) is equal to or greater than 750 and, moreover, the wire diameter is less than 0.45 mm, then the curvature quantity AH of the strip-shaped steel cord 1 is less than 40 mm. That is, when the value of the free coil diameter/wire diameter (D/d) is equal to or greater than 750 (the free coil diameter D of the core wire 2 is 750 times the wire diameter d or more) and, moreover, the wire diameter d is less than 0.45 mm, the sheet uplift quantity H of the composite sheet 40 is held below 5 mm.

In summary with regard to the above-described results of the evaluation tests, it is required that the value of D/d be made equal to or greater than 750 (that the free coil diameter of the core wire 2 be made greater than the wire diameter d by 750 times or more) and, moreover, that the wire spacing Gd between mutually adjacent core wires 2 be made less than 20 μm in order to obtain excellent shape stability of the steel cord to be manufactured. In order to obtain excellent adhesion between the strip-shaped steel cord 1 and the belt layers 11a, 11b, it is required that the thickness Ad of the adhesive 3 be made less than 15 μm. Furthermore, in order to hold curling of the composite sheet 40, in which the strip-shaped steel cord 1 has been embedded, to within 5 mm to thereby assure flatness, it is required that the value of D/d be made equal to or greater than 750 (that the free coil diameter of the core wire 2 be made greater than the wire diameter d by 750 times or more) and, moreover, that the wire diameter d be made less than 0.45 mm.

The invention claimed is:

1. A strip-shaped steel cord in which multiple brass-plated steel core wires arrayed in parallel with one another are bundled with said parallel array being maintained intact, wherein:
   a wire diameter of each of said core wires is less than 0.45 mm;
   the surface thereof is coated with an adhesive to a thickness of less than 15 μm and the multiple core wires are fixed together into a unitary body by said adhesive;
   a spacing between mutually adjacent core wires is less than 20 μm; and
   free coil diameter of each of said core wires is greater than the wire diameter by 750 times or more.

2. A strip-shaped steel cord according to claim 1, wherein said wire diameter is equal to or greater than 0.15 mm and less than 0.45mm.

3. A belt layer for tires, said belt layer having embedded therein the strip-shaped steel cord set forth in claim 1.

4. A tire having the belt layer for tires set forth in claim 3.

* * * * *